(12) United States Patent
Moler

(10) Patent No.: US 8,397,224 B2
(45) Date of Patent: Mar. 12, 2013

(54) METHODS AND SYSTEM FOR EXECUTING A PROGRAM IN MULTIPLE EXECUTION ENVIRONMENTS

(75) Inventor: Cleve Moler, West Newbury, MA (US)

(73) Assignee: The MathWorks, Inc., Natick, MA (US)

( * ) Notice: Subject to any disclaimer, the term of this patent is extended or adjusted under 35 U.S.C. 154(b) by 1521 days.

(21) Appl. No.: 10/940,152

(22) Filed: Sep. 13, 2004

(65) Prior Publication Data

US 2006/0059473 A1    Mar. 16, 2006

(51) Int. Cl.
    *G06F 9/44*    (2006.01)
    *G06F 9/45*    (2006.01)
(52) U.S. Cl. .................. 717/149; 717/119; 717/150
(58) Field of Classification Search .............. 717/119, 717/149, 150
    See application file for complete search history.

(56) References Cited

U.S. PATENT DOCUMENTS

| | | | |
|---|---|---|---|
| 5,450,313 A | 9/1995 | Gilbert et al. | |
| 6,622,301 B1 * | 9/2003 | Hirooka et al. | 717/149 |
| 7,234,138 B2 | 6/2007 | Crevatin | |
| 2004/0261058 A1 * | 12/2004 | Kundert | 717/119 |

OTHER PUBLICATIONS

Moler, Why there isn't a parallel MATLAB, 1995, from applicant's submitted Information Disclosure Statement, http://www.mathworks.com/company/newsletters/news_notes/pdf/spr95cleve.pdf.*

Moler, Why there isn't a parallel MATLAB, 1995, from applicant's submitted Information Disclosure Statement, http://www.mathworks.com/company/newsletter/news_notes/pdf/spr95cleve.pdf.*

Trefethen et al, MultiMATLAB: MATLAB on Multiple Processors, 1996, Cornell Theory Center, from Information Disclosure Statement by the Applicant.*

Chen et al, MATLAB G: A Grid-Based Parallel MATLAB, Grid Competition Grand Final, [Online], Jan. 10, 2004, from Information Disclosure Statement by the Applicant.*

Markatos et al, Using Processor Affinity in Loop Scheduling on Shared-Memory Multiprocessors, Proceedings of the 1992 ACM/IEEE conference on Supercomputing, pp. 104-113.*

Menon et al. (MultiMATLAB: integrating MATLAB with high-performance parallel computing, Proceeding Supercomputing '97 Proceedings of the 1997 ACM/IEEE conference on Supercomputing).*

Husbands, Parry Jones Reginald, "Interactive Supercomputing," pp. 1-96 (1999).

Attiya, Hagit et al., "Sharing Memory Robustly in Message-Passing Systems," Journal of the Association for Computing Machinery, vol. 42(1):124-142 (1995).

International Preliminary Report on Patentability for Application No. PCT/US2005/033069, 14 pages, dated Mar. 13, 2007.

Chen, Ying et al, "MATLAB G: A Grid-Based Parallel MATLAB," Retrieved from the Internet: http://www.ntu-cg.ntu.edu.sg/GRID_competition/report/grid-9.pdf (2006.

(Continued)

*Primary Examiner* — Li B Zhen
*Assistant Examiner* — Hang Pan
(74) *Attorney, Agent, or Firm* — Nelson Mullins Riley & Scarborough LLP

(57) ABSTRACT

A system and methods are disclosed for executing a technical computing program in parallel in multiple execution environments. A program is invoked for execution in a first execution environment and from the invocation the program is executed in the first execution environment and one or more additional execution environments to provide for parallel execution of the program. New constructs in a technical computing programming language are disclosed for parallel programming of a technical computing program for execution in multiple execution environments. It is also further disclosed a system and method for changing the mode of operation of an execution environment from a sequential mode to a parallel mode of operation and vice-versa.

12 Claims, 10 Drawing Sheets

OTHER PUBLICATIONS

Choy, Ron et al, "Parallel MATLAB: Doing it Right," Retrieved from the Internet: www.interactivesupercomputing.com/downloads.pmatlab.pdf (2006).

Moler, Cleve, "Why there isn't a parallel MARLAB," Retrieved from the Internet: http://www.mathworks.com/company/newsletters/news_notes/pdf/spr95clefe.pdf, (1995).

Trefethen, A. et al, "MultiMATLAB: MATLAB on Multiple Processors," Retrieved from the Internet: http://www.cs.cornell.edu/Info/People/Int/multimatlab.html, (1996).

International Search Report for Application No. PCT/US2005/033069, dated Sep. 5, 2006.

* cited by examiner

METHODS AND SYSTEM FOR EXECUTING A PROGRAM IN MULTIPLE EXECUTION ENVIRONMENTS

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present invention generally relates to technical computing, and, more particularly, the execution of a computer program in parallel in multiple execution environments.

BACKGROUND INFORMATION

MATLAB® is a product of The MathWorks, Inc. of Natick, Mass., which provides engineers, scientists, mathematicians, and educators across a diverse range of industries with an environment for technical computing applications. MATLAB® is an intuitive high performance language and technical computing environment that provides mathematical and graphical tools for mathematical computation, data analysis, visualization and algorithm development. As a desktop application, MATLAB® typically runs on a single computer and serially executes technical computer programs. However, a single computer executing a program sequentially can be limiting as to the size and the type of the problem that can be solved. For example, some complex and data intensive problems are too large to fit in the memory space of a single computer. In another example, a complex and data intensive problem may take an unreasonable amount of time to run on a single computer.

With the availability of more cost effective parallel computers, such as Beowolf clusters, researchers and scientists are interested in parallel computing in a technical computing environment such as MATLAB®. However, the use of low level parallel programming paradigms is difficult even for the more advanced users. Such parallel programming paradigms require extensive message passing between computing environments to coordinate and control parallel computing activities. Less advanced users who are well versed in the user friendly technical computing programming language of MATLAB® may find it challenging to design and develop technical computing programs for parallel processing.

With many engineering and scientific problems requiring larger and more complex modeling that would benefit from parallel computing, it is desirable to provide a technique to execute in parallel a technical computing program in a user-friendly manner. Systems and methods are needed to execute a technical computing program in parallel in multiple execution environments.

SUMMARY OF THE INVENTION

The present invention provides a system and methods for executing a computer program in parallel in multiple execution environments. A program, such as a technical computing program, is invoked for execution in a first execution environment, such as a technical computing environment. From the invocation, the program is executed in the first execution environment and one or more additional execution environments to provide for parallel execution of the program. This provides an easy method for the same program to be invoked and executed on multiple computers and/or multiple processors to leverage the computing power of multiple computing resources. This is done without requiring the user of the technical computing environment to understand how to program parallel programming paradigms. A program written to be run sequentially in the execution environment is run in parallel in multiple environments with little or no changes to the program. Additionally, the system and methods of the present invention enable a user to easily switch the execution environment from operating in a sequential mode of operation to a parallel mode of operation, and vice-versa.

For more advanced users, the present invention provides technical computing programming language constructs to program parallel programming paradigms for a technical computing program that may execute in parallel in multiple execution environments. The technical computing programming language constructs provide for the distribution of processing of a portion of program instructions and related data in one of the multiple execution environments. This provides the more advanced users programming flexibility to handle more complex parallel programming needs.

In one aspect, the present invention is related to a method to invoke an execution of a computer program in multiple execution environments. The method comprises the step of invoking a request to initiate an execution of a computer program in a first execution environment. The method further includes initiating, from the request, a first execution of the computer program in the first execution environment, and communicating, in response to the request, a message from the first execution environment to a second execution environment to initiate a second execution of the computer program in the second execution environment. The message communicated from the first execution environment to the second execution environment may comprise the computer program. In a further aspect, the first execution environment sends a message to the second execution environment via a message passing interface.

The computer program of the second execution environment comprises at least a portion of computer instructions from the computer program of the first execution environment, or the computer program of the second execution environment may comprise each computer instruction from the computer program of the first execution environment. In another aspect, the method further comprises the first execution environment executing the computer program and the second execution environment executing the computer program. The computer program may comprise one or more computer instructions of a technical computing programming language, and the first execution environment and the second execution environment may each comprise a technical computing environment.

In another aspect, the first execution environment and the second execution environment may execute on separate processors and/or separate computers. Additionally, the first execution environment may execute on an operating system different than the operation system the second execution environment executes on. Furthermore, the first execution environment may execute on a processor different than a processor the second execution environment executes on.

In another aspect, the present invention relates to a device readable medium holding device readable instructions to execute the steps of the method, as described above, to invoke an execution of a computer program in multiple execution environments.

In one aspect, the present invention relates to a method of initiating a parallel execution operation mode in an execution environment. The method comprises the steps of providing a first execution environment having a first mode of operation to execute a computer program sequentially and a second mode of operation to execute the computer program on multiple execution environments. The method further includes invoking a request to initiate the first execution environment to operate in the second mode of operation, and sending, in response to the request, a message from the first execution environment to at least one or more of the execution environments to initiate to listen for a request from the first execution environment to perform execution of the computer program. The method further comprises the step of invoking a request to initiate the first execution environment to operate in the first mode. The method may comprise providing an indicator representing the execution environment is operating in one of the first mode and the second mode.

In another aspect, the present invention relates to a device readable medium holding device readable instructions to execute the steps of the method, as described above, related to initiating a parallel execution operation mode in an execution environment.

In one aspect, the present invention relates to a method for programmatically distributing an array to multiple technical computing environments for parallel technical computing processing. The method comprises the steps of providing a technical programming language statement to form a program instruction in a technical computing program. The technical programming language statement represents an array to distribute for parallel processing by multiple technical computing environments. The technical programming language statement may comprise a built-in keyword of the technical programming language. The method further includes invoking the execution of the program instruction to store a first portion of the array in a first technical computing environment and to store a second portion of the array in a second technical computing environment. The first portion may comprise a first column of the array and the second portion, a second column of the array. The first technical computing environment can take an action to perform an operation on the first portion of the array and the second technical computing environment can take an action to perform an operation on the second portion of the array. Furthermore, the first technical computing environment and the second technical computing environment may obtain cached data of other portions of the array.

In another aspect, the present invention relates to a device readable medium holding device readable instructions to execute the steps of the method, as described above, related to programmatically distributing an array to multiple technical computing environments for parallel technical computing processing.

In one aspect, the invention is related to a method for programmatically providing a parallel loop control structure for parallel technical computing with multiple technical computing environments. The method comprises the steps of providing a technical programming language control structure to form a program instruction in a technical computing program. The technical programming language control structure represents a parallel loop with a loop body comprising one or more program instructions to be executed by multiple technical computing environments. The technical programming language construct may comprise a built-in keyword of the technical programming language. The method further includes invoking execution of the program instruction to perform a first iteration of the loop body by a first technical computing environment and to perform a second iteration of the loop body by a second technical computing environment. The first iteration of the parallel loop is executed independently from the second iteration of the parallel loop. Additionally, the loop body may comprise one or more program instructions to be performed only by one of the first technical computing environment and the second technical computing environment.

In another aspect, the present invention relates to a device readable medium holding device readable instructions to execute the steps of the method, as described above, related to programmatically providing a parallel loop control structure for parallel technical computing with multiple technical computing environments.

In yet another aspect, the present invention relates to a method for programmatically providing a conditional control structure for determining the process identification of a technical computing environment for parallel technical computing processing with a plurality of technical computing environments. The method comprises the steps of providing a technical programming language control structure to form a program instruction in a technical computing program, the technical programming language control structure representing a conditional statement comprising a Boolean expression that if evaluates to true indicates that a technical computing environment of a plurality of technical computing environments is the technical computing environment to execute a selection of one or more program instructions associated with the conditional statement. The technical programming language control structure may comprise a built-in keyword of the technical programming language. The method further includes invoking the execution of the program instruction to determine if the technical computing environment of the plurality of technical computing environments executing the program instruction should execute the selection of one or more program instructions associated with the conditional statement. The conditional statement may comprise an expression to evaluate the process identifier of the technical computing environment executing the conditional statement. Furthermore, the process identifier may be determined from a function call in the technical computing environment.

In another aspect, the present invention relates to a device readable medium holding device readable instructions to execute the steps of the method, as described above, related to programmatically providing a conditional control structure for determining the process identification of a technical computing environment for parallel technical computing processing with a plurality of technical computing environments.

In one aspect, the present invention relates to a system to operate multiple technical computing environments in parallel. The system comprises a first technical computing environment, a second technical computing environment and a job manager. The first technical computing environment invokes a command to initiate multiple technical computing environments to operate in a parallel technical computing mode. The job manager, in communication with the first technical computing environment, receives a job from the first technical computing environment. The job manager communicates a task associated with the job to one or more of the multiple technical computing environments to initiate listening for communications from one or more technical computing environments. The job manager may communicate to one of the first technical computing environment and the second technical computing environment information identifying one or more of the technical computing environments. The second technical computing environment, in communication with the job manager, receives the task and initiates listening for communications from one or more technical computing environments.

In one aspect, one of the first technical computing environment and the second technical computing environment wait on a message passing interface to receive a message from the plurality of technical computing environments. In another aspect, one of the first technical computing environment and the second technical computing environment listens on a TCP/IP port for network communications from the plurality of technical computing environments. In a further aspect, the first technical computing environment invokes execution of a command and communicates a message to the second technical computing environment to invoke execution of the command.

The details of various embodiments of the invention are set forth in the accompanying drawings and the description below.

BRIEF DESCRIPTION OF THE DRAWINGS

The foregoing and other objects, aspects, features, and advantages of the invention will become more apparent and may be better understood by referring to the following description taken in conjunction with the accompanying drawings, in which.

DETAILED DESCRIPTION

Certain embodiments of the present invention are described below. It is, however, expressly noted that the present invention is not limited to these embodiments, but rather the intention is that additions and modifications to what is expressly described herein also are included within the scope of the invention. Moreover, it is to be understood that the features of the various embodiments described herein are not mutually exclusive and can exist in various combinations and permutations, even if such combinations or permutations are not made express herein, without departing from the spirit and scope of the invention.

The illustrative embodiment of the present invention provides for execution of a computer program in parallel in multiple execution environments. A computer program, such as a technical computing program, can be invoked once in a first execution environment, such as a technical computing environment, and from the invocation be executed in multiple execution environments. Additionally, the system and methods of the present invention enable a user to switch the execution environment from operating in a sequential mode of operation to a parallel mode of operation, and vice-versa, to either execute a technical computing program in parallel in multiple execution environments or sequentially in a single execution environment.

Furthermore, the illustrative embodiment provides for technical programming language constructs to develop program instructions of the computer programs to be executed in parallel in multiple technical computing environments. These technical programming language constructs have built-in keywords of the programming language reserved for their functionality. One of these constructs is a parallel for loop to provide parallel execution of iterations of the loop body across multiple execution environments. Another construct is a distributed array element for technical computing operations executing across multiple execution environments. A further construct is an if statement to check if the current execution environment is the one executing the current set of program instructions.

The illustrative embodiment will be described solely for illustrative purposes relative to a MATLAB® technical computing environment. Although the illustrative embodiment will be described relative to a MATLAB®-based application, one of ordinary skill in the art will appreciate that the present invention may be applied to parallel execution of a computer program, such as a technical computing program, in multiple execution environments, such as an execution environment provided by a technical computing environment using software products of LabVIEW® or MATRIXx from National Instruments, Inc., or Mathematica® from Wolfram Research, Inc., or Mathcad of Mathsoft Engineering & Education Inc., or Maple™ from Maplesoft, a division of Waterloo Maple Inc.

Figure 1A:
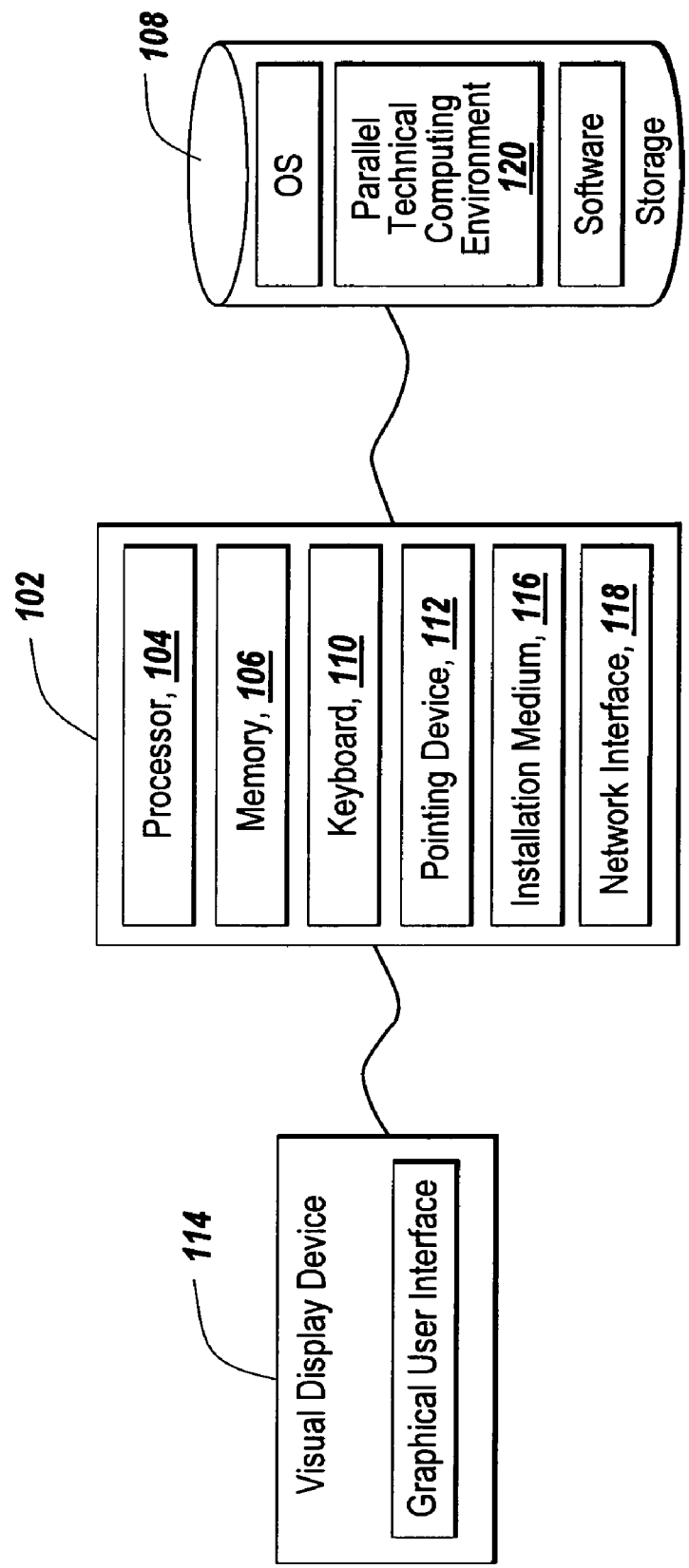
FIG. 1A is a block diagram of a computing device for practicing an embodiment of the present invention.

FIG. 1A depicts an environment suitable for practicing an illustrative embodiment of the present invention. The environment includes a computing device 102 having memory 106, on which software according to one embodiment of the present invention may be stored, a processor (CPU) 104 for executing software stored in the memory 106, and other programs for controlling system hardware. The memory 106 may comprise a computer system memory or random access memory such as DRAM, SRAM, EDO RAM, etc. The memory 106 may comprise other types of memory as well, or combinations thereof. A human user may interact with the computing device 102 through a visual display device 114 such as a computer monitor, which may include a graphical user interface (GUI). The computing device 102 may include other I/O devices such a keyboard 110 and a pointing device 112, for example a mouse, for receiving input from a user. Optionally, the keyboard 110 and the pointing device 112 may be connected to the visual display device 114. The computing device 102 may include other suitable conventional I/O peripherals. The computing device 102 may support any suitable installation medium 116, a CD-ROM, DVD-ROM, floppy disks, tape device, USB device, hard-drive or any other device suitable for installing software programs such as the present invention of a parallel technical computing environment 120. The computing device 102 may further comprise a storage device 108, such as a hard-drive or CD-ROM, for storing an operating system and other related software, and for storing application software programs such as the parallel technical computing environment 120. Additionally, the operating system and the technical computing environment 120 of the present invention can be run from a bootable CD, such as, for example, KNOPPIX®, a bootable CD for GNU/Linux.

Additionally, the computing device 102 may include a network interface 118 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25), broadband connections (e.g., ISDN, Frame Relay, ATM), wireless connections, or some combination of any or all of the above. The network interface 118 may comprise a built-in network adapter, network interface card, PCMCIA network card, card bus network adapter, wireless network adapter, USB network adapter, modem or any other device suitable for interfacing the computing device 118 to any type of network capable of communication and performing the operations described herein. Moreover, the computing device 102 may be any computer system such as a workstation, desktop computer, server, laptop, handheld computer or other form of computing or telecommunications device that is capable of communication and that has sufficient processor power and memory capacity to perform the operations described herein.

The present invention provides a parallel technical computing environment 120 for executing technical computing programs, such as computer programs created in the technical computing programming language of MATLAB®. The parallel technical computing environment 120 can be an application, module, service, software component or any other type of computer program which is designed to and capable of executing a program supported by the parallel technical computing environment 120, for example such as a computer program written in the programming language of MATLAB® executed in the command window of a MATLAB® session. Furthermore, the parallel technical computing environment 120 of MATLAB® may be configured to and capable of running any of the modules, libraries or software components of the MATLAB® product family. As such, the parallel technical computing environment 120 may have all or a portion of the software components of MATLAB® installed on the computing device 102, or alternatively, accessible from another computing device 102' on a network.

A session is an instance of a MATLAB® parallel technical computing environment 120 by which a user, which may be another computer program, can access the services and functionality provided by the parallel technical computing environment 120. For example, a running instance of MATLAB®, such as a command window, may be a session. The session may be available for a certain time period or to a certain user, or it may used over and over again by different users. A user may start up one session on one computing device 102 and another session on the same computing device 102, or another computing device 102. One ordinarily skilled in the art will appreciate the use of the term session to generally mean accessing in a variety of ways the functionality provided by a parallel technical computing environment 120 such as MATLAB®. A session of MATLAB® may just include those software components the parallel technical computing environment 120 may need to execute the computer programs it receives. Another session of MATLAB® may include a set of software components different from the set of software components of a first session on the same computing device 102.

In one aspect, the parallel technical computing environment 120 provides an execution environment from which a computer program can be invoked and executed. The computer program can have program instructions that access the services and functionality provided by the parallel technical computing environment 120. For example the computer program may perform a calculation on variables available in a calculation workspace of the parallel technical computing environment 120. In an exemplary embodiment, access to the execution environment of the parallel technical computing environment 120 is provided by a command window. The command window may be provided within a graphical user environment, such as the desktop environment of MATLAB®. A command line interface for the parallel technical computing environment 120 may also be provided from the command line interface, or shell environment, provided by the operating system which the technical computing environment 120 is running on. For example, at a Windows command line prompt or UNIX shell prompt, a command may be issued to invoke a command line interface or shell for the technical computing environment 120. From the command line interface of the parallel technical computing environment 120, commands can be typed in at the command line for execution by the parallel technical computing environment 120. The command window or the command line interface of a parallel technical computing environment 120 of MATLAB® can accept commands to run programs, functions, scripts, enter data and any other command MATLAB® may be configured to execute.

The execution environment may provide for execution of programs by a variety of other means. For example, a computer program may be invoked via a menu item on a graphical user interface. In another example, a computer program may be invoked by a shortcut in the desktop environment of MATLAB® or the desktop environment of the operating system. In yet another example, another computer program can be written to interface with the execution environment to invoke a program. For example, an execution environment may provide an application programming interface that can be called to invoke a program in the execution environment. One ordinarily skilled in the art will appreciate the variety of ways a program, function or script may be invoked in an execution environment, such as the execution environment provided by the parallel technical computing environment 120 of the present invention.

Figure 1B:
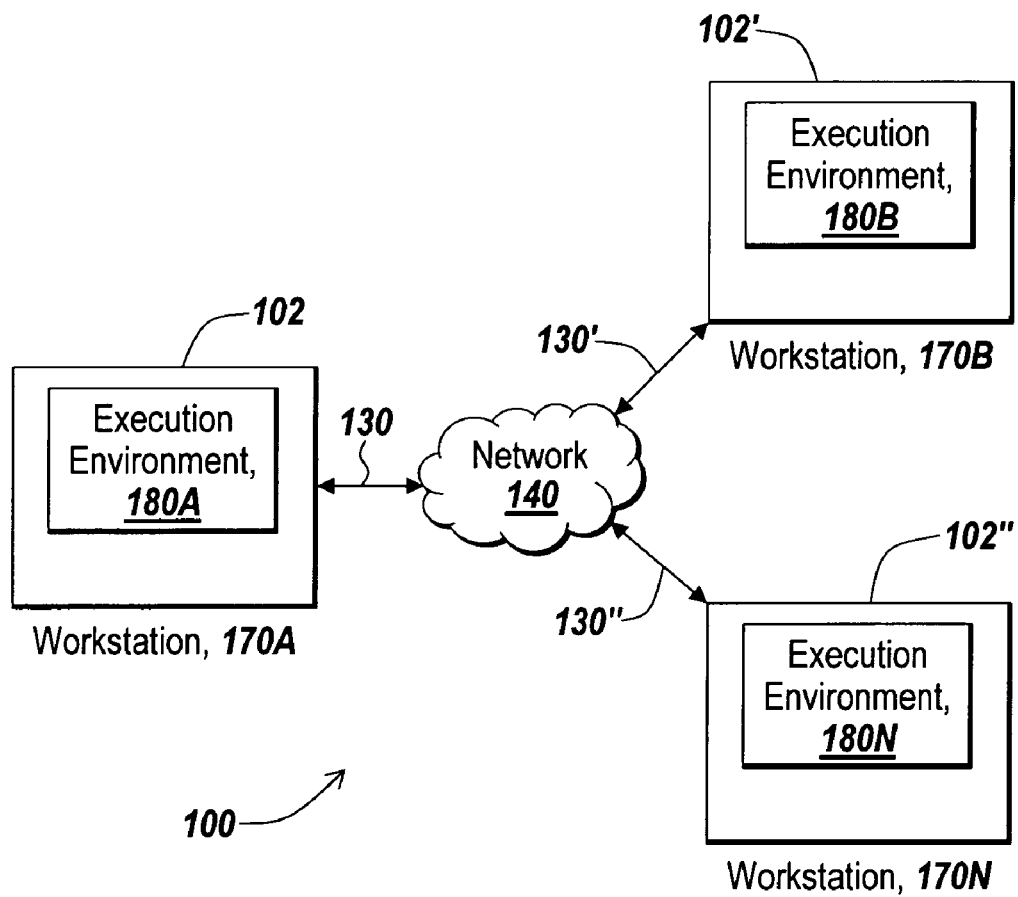
FIG. 1B is a block diagram of a distributed computing system for practicing an illustrative embodiment of the present invention.

FIG. 1B depicts another environment suitable for practicing an illustrative embodiment of the present invention, where the execution environments provided by the parallel technical computing environment 120 are deployed in a distributed client-server system on a network. In a broad overview, the system 100 depicts a multiple node network 140 for executing a computer program in multiple execution environments 180a-180n. The system 100 includes multiple workstations 170a-170n connected to and communicating over a network 140. The system 100 may have one or more workstations 170a-170n, each communicating over a network 140 and with any other workstation 170a-170b. The topology of the network 140 over which the workstations 170a-170n communicate may be a bus, star, or ring network topology. The network 140 can be a local area network (LAN), a metropolitan area network (MAN), or a wide area network (WAN) such as the Internet. In one embodiment (now shown), the network 140 is separated into networks 140 and 140'. The networks 140 and 140' can be the same type of network or different types of networks. In one embodiment, the network 140 and/or the network 140' is, for example, a local-area network (LAN), such as a company Intranet, or a wide area network (WAN), such as the Internet or the World Wide Web. The network 140 and network topology may be of any such network 140 or network topology capable of supporting the operations of the present invention described herein.

The workstation nodes 170a-170n can connect to the network 140 through a variety of connections including standard telephone lines, LAN or WAN links (e.g., T1, T3, 56 kb, X.25, SNA, DECNET), broadband connections (ISDN, Frame Relay, ATM, Gigabit Ethernet, Ethernet-over-SONET), cluster interconnections (Myrinet), peripheral component interconnections (PCI, PCI-X), and wireless connections, or some combination of any or all of the above. Connections can be established using a variety of communication protocols (e.g., TCP/IP, IPX, SPX, NetBIOS, Ethernet, ARCNET, Fiber Distributed Data Interface (FDDI), RS232, IEEE 802.11, IEEE 802.11a, IEEE 802.11b, IEEE 802.11g, and direct asynchronous connections).

Each of the workstations 170a-170n can be any type of computing device (102, 102" and 102''') as described above and respectively configured to be capable of computing and communicating the operations described herein. For example, any and each of the workstations 170a-170n may be a server, a multi-user server, server farm or multi-processor server. It could also be a parallel processing super computer or a cluster of computers such as a Beowolf cluster. A Beowolf cluster is a parallel computer built from commodity off-the-shelf processors connected by commodity network connections. In another example, any of the workstations 170a-170n may be a mobile computing device such as a notebook or PDA. One ordinarily skilled in the art will recognize the wide range of possible combinations of types of computing devices capable of communicating over a network.

Each of the workstations 170a-170n are configured to and capable of running an execution environment 180a-180n of the present invention of a parallel technical computing environment 120. As discussed above, the execution environment 180a-180n provides an interface such as a command window for executing a program within the technical computing environment. Furthermore, each execution environment 180a-180n can be capable of and configured to operate on the operating system that may be running on any of the computing device (e.g., 102, 102', and 102"). Each workstation 170a-170n can be running the same or different operating system. For example, the workstation 170a can running Microsoft® Windows, workstation 170b can be running a version of Unix, and the workstation 170n a version of Linux. Or each workstation 170a-170n can be running the same operating system, such as Microsoft® Windows. Additionally, the execution environments 180a-180n can be capable of and configured to operate on and take advantage of different processors of any of the computing devices (e.g., 102, 102', and 102"). For example, the execution environment 180a-180n can run on a 32 bit processor of one computing device 102 and a 64 bit processor of another computing device 102'.

In a network client server system, such as the system depicted in FIG. 1B, The parallel technical computing environment can operate on computing devices (102, 102', and 102") that can be running on different processor architectures in addition to different operating systems. One ordinarily skilled in the art will recognize the various combinations of operating systems and processors that can be running on any of the computing devices (102, 102', and 102"). In summary, the execution environment 180a-180n and the parallel technical computing environment 120 may be deployed across a wide range of different computing devices, different operating systems and different processors in various network topologies and configurations.

Figure 2A:
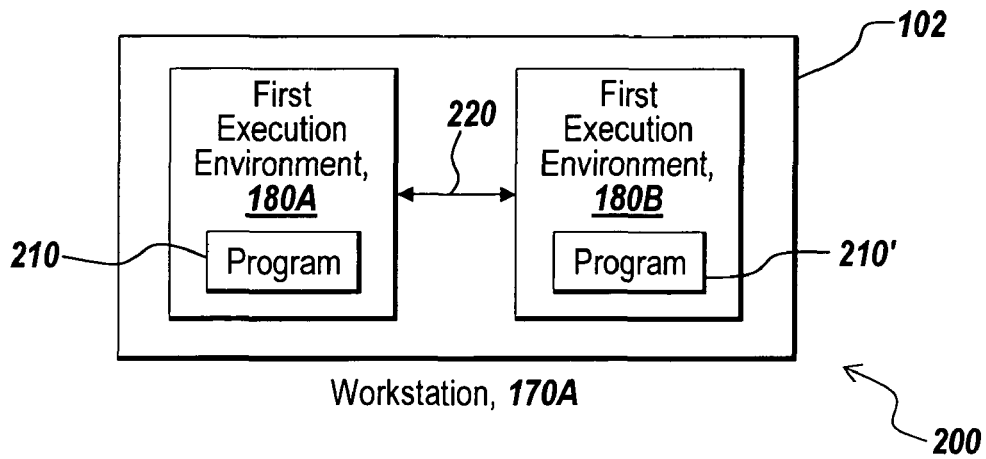
FIG. 2A is a block diagram of the components of an embodiment of the present invention in a computer system.

FIG. 2A depicts an illustrative embodiment of an execution environment of a parallel technical computing environment 120 running in a single node computing device 102. In brief overview, the system 200 of the parallel technical computing environment 120 is a single node computing device 102 of workstation 170A comprising a first execution environment 180a and a second execution environment 180b. Each of the first execution environment 180a and the second execution environment 180b is configured to and capable of invoking and executing a computer program 210, 210'. In certain embodiments, the workstation 170a may be a single, dual or multi-processor computing device 102. In a certain embodiment, the execution environments of 180a and 180n can be on separate processors of workstation 170a. Each execution environment may also comprise a separate thread on each processor. The first execution environment 180a and second execution environment 180b may be the parallel technical computing environment 120 of MATLAB®, or any other execution environment capable of running the computer program 210, 210'. In other embodiments, the first execution environment 180a and second execution environment 180b may be the same version or different versions of MATLAB®. Also, in alternative embodiments, the first execution environment 180a and the second execution environment 180b may be different types of execution environments 180a-180b. For example, the first execution environment 180a may be the parallel technical computing environment 120 of MATLAB® while the second execution environment 180b may another product capable of interfacing with the first execution environment 180A and performing the operations described herein.

The first execution environment 180a and second execution environment 180b are capable of communicating to each other via an interface 220. In an exemplary embodiment, the first execution environment 180a and second execution environment 180b can communicate to each other by sending messages via a message passing interface 210. One such example is MPI, which is a de facto standard, created by the group of vendors, computer scientists and users making up the MPI Forum. MPI is a message-passing library specification defining a collection of subroutines and arguments used for communication among nodes running a parallel program on a distributed memory system. Implementation of the MPI specification permits programs with separate address spaces to synchronize with one another and move data from the address space of one process to that of another by sending and receiving messages. In other embodiments, the first execution environment 180a and second execution environment 180b can interface via socket based communications over TCP/IP implementing a custom message specification. In further embodiments, the execution environments 180a-180b may communicate using any available messaging communications products and/or custom solutions that allow the execution environments to send and receive messages. In certain embodiments, the interface 220 comprises a file interfacing mechanism such as reading and writing to files on a network accessible directory or common file system. Furthermore, the first execution environment 180a and second execution environment 180b can each be waiting or listening for messages from any execution environment 180a-180b on the network 140. For example, in an exemplary embodiment, the second execution environment 180b can make an MPI function call to wait for a request from a first execution environment 180a that may send the request via an MPI function call. In another embodiment, the second execution environment 180b can be initialized to wait on a certain TCP/IP port to receive messages from first execution environment 180a. One ordinarily skilled in the art will recognize the various types of interfaces to communicate messages between execution environments 180a-180b.

Each of the first executing environment 180a and second execution environment 180b are capable of executing a computer program 210. The computer program 210 may comprise one or more program instructions to be executed in the execution environments 180a-180b. In an exemplary embodiment, the computer program 210 is written in the technical computing programming language of MATLAB® and the execution environments 180a-180b are the parallel technical computing environments 120 of MATLAB®. In alternative embodiments, the computer programs 210 can be written in any programming language capable of being executed or otherwise support by the execution environments 180a-180b. Furthermore, the computer program 210 may be a function, script or other set of program instructions that can be invoked and executed within the execution environment 180a-180b.

The programming language of the parallel technical computing environment 120 of MATLAB® provides a variety of ways to invoke a program 210 in an execution environment 180a-180n. Any of the MATLAB® programming language statements can be executed on the command line. Additionally, the programming language includes procedural function calls such as eval( ) and feval( ) that provide a quick and powerful procedure to execute functions. Also, the MATLAB® programming language enables you to write a series of MATLAB® statements into a file, referred to as an M-File, and then execute the statements in the file with a single command. M-files can be scripts that simply execute a series of MATLAB® statements, or they can be functions that also accept input arguments and produce output.

Furthermore, the MATLAB® programming language supports anonymous functions and function handles. Function handles are useful when you want to pass your function in a call to some other function when that function call will execute in a different workspace context than when it was created. Anonymous functions, denoted with an @ sign, give you a quick means of creating simple functions without having to create M-files each time and can be viewed as a special subset of function handles. An anonymous function can be created either at the MATLAB® command line or in any M-file function or script. Anonymous functions also provide access to any MATLAB® function. By way of example of the programming language of MATLAB®, one ordinary skilled in the art will recognize the various permutations and combinations of program instructions that can make up a program 210 to be invoked and executed in an execution environment 180-180n.

In operation, the computer program 310 is invoked from the first execution environment 180a so that it is executed on the first execution environment 180a and also executed on the second execution environment 180b. For example, in a command window of the first execution environment 180a, a user may type in the name of a computer program 210 to invoke. The first execution environment 180a receives the request to invoke the program 210. In response to the request, the first execution environment 180a sends a message via the interface 220 to the second execution environment to invoke the program 210. The first execution environment 180a then executes the program 210. In an alternative embodiment, the first execution environment 180a starts to first execute the program 210 and then sends the message to the second execution environment 180b. After receiving the request from the first execution environment 108a, the second execution environment 180b executes the program 210. In an exemplary embodiment, the request is sent immediately or as soon as possible after the program is invoked in the first execution environment 170a. The message sent from the first execution environment 180a to the second execution environment 180b may comprise, in an exemplary embodiment, the program 210. In other embodiments, the message may contain the program 210 with other portions of the message, such as another command or request. In further embodiments, the message may contain a reference to the program 210 that the second execution environment 180b may be able to reference or infer the actual name of the program 210. In still another embodiment, the message may contain a portion of or all of the program instructions of the program 210, or optionally the name of a file with the contents of the program instructions. Although the program invocation request on the first and second execution environments 180a-180n are generally discussed with regards to a single request, the program invocation request may comprise multiple requests. One ordinarily skilled in the art will recognize the various forms that message may have to request an execution environment to execute a program.

In an exemplary embodiment, the program 210 invoked from the first execution environment 180a is the same program 210' executed on the second execution environment 180b. In another embodiment, the program 210' to be executed on the second execution environment comprises a portion of all or part of the program 210 invoked and executed in the first execution environment 180a. For example, the program 210' may be altered, changed, modified, added to or otherwise pre-processed prior to executing on the second execution environment 108b. These changes may be required to adapt the program 210' to the specific execution environment 108b, such as one running an operating system different than the first computing environment 108a. Or it may to add some additional functionality to the program 210 before executing the program 210'. In other cases, the execution environments 180a-180b may each point to their own reference to or copy of the program 210. Each program 210, 210' may comprise the same functionality but adapted to the specifics of either the operating system or execution environment the program 210 is targeted to be executed on. However, even if the programs 210, 210' are different, they may be referenced by the same name so that the when the program 210 is invoked from the first execution environment 180a, the programs 210 and 210' get executed on both the first execution environment 108a and second execution environment 108b.

This technique of executing the same, or nearly the same program, in multiple execution environments 180a-180n from one command request allows the user to perform parallel processing in a very simplified manner. The user types in the name of the program at one command window and had the program runs in multiple execution environments 180a-180n. This is particularly useful in that existing programs 210 designed for the technical computing environment of MATLAB® can be run in the parallel technical computing environment 120 of MATLAB® with little or no changes. Also, a user can write a program 210 to run in a parallel fashion using the technical computing programming language of MATLAB® without learning any details of parallel programming such as the low level details of an MPI programming interface. This technique also reduces the number of messages and related performance factors with sending messages that is typical in parallel programming paradigms where the user is responsible for managing and coordinating portions of the program being processed by multiple execution environments. This approach favors simplicity over any redundancy that may occur in executing the same program instructions unnecessarily multiple times.

Figure 2B:
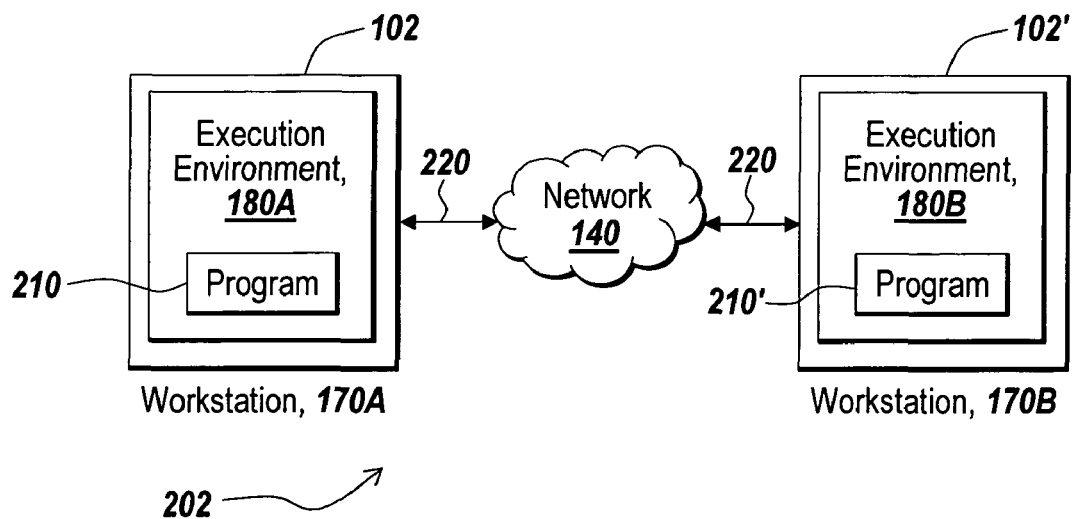
FIG. 2B is a block diagram of the components of an alternative embodiment of the present invention in a networked computer system.
Figure 2C:
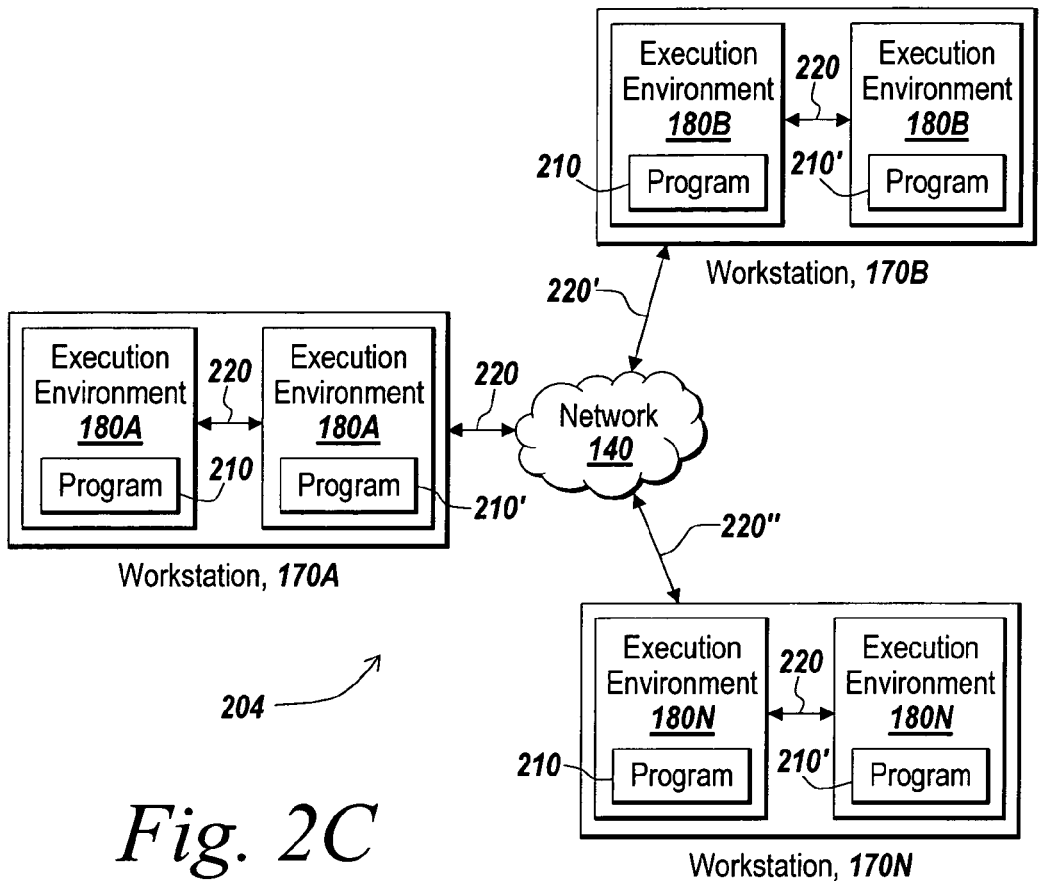
FIG. 2C is a block diagram of the components of an exemplary embodiment of the present invention in a distributed network computer system.

Referring now to FIGS. 2B and 2C, the present invention of a parallel technical computing environment 120 can be distributed to multiple execution environments 180a-180n running in multiple nodes of a network 140. As shown in FIG. 2B, the present invention as shown in FIG. 2A can be practiced in a two-node networked computer system 202. In brief overview, the system 202 has a workstation 170a and a workstation 170b each a computing device 102, 102' as described above. The workstations 170a and 170b are connected to and communicating over a network 140, and each have and can run an execution environment 180a and 180n. Each of the execution environments 180a-180b can interface 220 to each other over the network 140 to send and receive a message or messages for executing a program 210, and in further embodiments for sharing data and other information related to executing the program 210. In operation of the system 202 in FIG. 2B, a program 210 is invoked in the execution environment 180a, which in response to and upon the execution request, sends a message via the interface 220 to the execution environment 180b on workstation 180b to execute the program 210. The execution environments 170a and 170b execute the program 210 respectively on each workstation 180a and 180b.

Referring now to FIG. 3C, the present invention of the parallel technical computing environment 120 can be deployed in a variety of nodes and processors across the network 140. In overview of the multi-node networked system 204 of FIG. 3C, there are multiple workstations 170a-170n connected and communicating over a network 140. Each workstation 170a-170n can have multiple execution environments 180a-180n, with each execution environment 180a-180n able to communicate with the other execution environments via an interface 220 locally or over the network 140. In certain embodiments, the interface 220 of an execution environment, for example execution environment 180a of workstation 170a, may be different than the interface 220 of another execution environment, for example execution environment 180b of workstation 170b. There may be a different interface 220 for interfacing execution environments 180a-180a' on the same workstation 170a versus interfacing between execution environments 180a-180n over the network 140. Each execution environment 180a-180n may be able to communicate via multiple different interfaces 220, 220' or may be configured to use a different interface 220 for communicating to certain execution environments 180a-180n. With any of the different and various interfaces 220, 220', the execution environment 180a-180n can receive and/or send a message with respect to invoking a program on another execution environment 180a-180n.

In certain embodiments, a workstation 170a-170n may be a multi-processor computing device 102. In another embodiment, a workstation 170a-170n may be a server or server cluster, such as a Beowulf cluster. In yet another embodiment, a workstation 170a can be a desktop computer with a single processor running multiple instances of the execution environment 180a, 180a'. One ordinarily skilled in the art will recognize the plenary of deployment scenarios for having multiple execution environments across various computing devices in a network.

In operation of the system 204, a program 210 is invoked on one of the execution environments, for example 180a. Through the interface 220, all of the execution environments, such as 180a' and 180b-180n', are sent a message from the first execution environment 180a to execute the program 210. All of the execution environments 180a-180n execute the program 210. With one invoking of a program 210 in one execution environment 180a, the processing and computing capabilities of all the nodes in the network are utilized.

Figure 3:
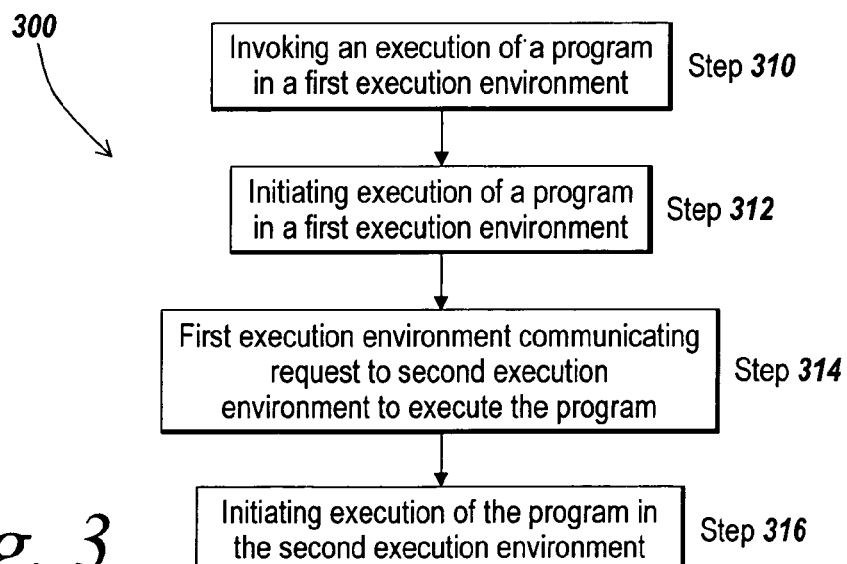
FIG. 3 is a flow diagram illustrating steps performed in operation of the present invention.

In another aspect, the present inventions relates to a method of executing a program in multiple execution environments with a program invocation request. Referring now to FIG. 3, the flow diagram of method 300 describes the method of practicing the embodiments of the present invention as shown in FIGS. 2A-2C. The method 300 comprises the step 310 of invoking an execution of a program in a first execution environment and step 312 initiating execution of the program in the first execution environment. The method further includes step 314 of communicating from the first execution environment a request to a second communication environment to execute the computer program, and then the second execution environment executing the computer program at step 316.

At step 312, in an exemplary embodiment, the program 210 is invoked on the first execution environment 180A by entering a command to invoke the program in a command window of the execution environment 180a. In one embodiment, this step may include invoking the program 210 by selecting a menu item in a graphical user interface. In another embodiment, the step 312 may include invoking the program by selecting a graphical icon representing a shortcut in the desktop environment of the execution environment 180a or the workstation 170A. One ordinarily skilled in the art will recognize the variety embodiments of this step of the method to invoke a program in an execution environment.

At step 312, the program 210 is executed in the execution environment as it would normally be in response to the invoke request in the first execution environment. In addition to executing the program 210 in response to invoking the program 210, the first execution environment 180a communicates a request to a second execution environment 180b to execute the program 210. In an exemplary embodiment, the first execution environment 180a communicates the request upon or immediately following the program invocation. The first execution environment 180a may communicate to the second execution environment 180b by sending a message comprising the program via an interface 220, such as a message passing interface. In another embodiment of this step, the first execution environment 180a may communicate to the second execution environment 180b by writing to a file.

Step 314 further includes the second execution environment 180b receiving the request from the first execution environment 180a to execute the program 210. In one embodiment, the second execution environment 180b was waiting for or listening for a request message via a message passing interface and performs an MPI function to read the sent message. In another embodiment, for example, when the first execution environment 180a writes to a file, the second execution environment 180b reads the file to obtain the message sent by the first execution environment 180a. In reading the request, the second execution environment 180b determines the program 210 to execute. In response to receiving the request from the first execution environment 180a, the second execution environment 180b executes the program 210 determined from the message. In this manner, the first execution environment 180a and the second execution environment 180b execute the same or similar program 210, from one program invocation in the first execution environment 180a.

Figure 4A:
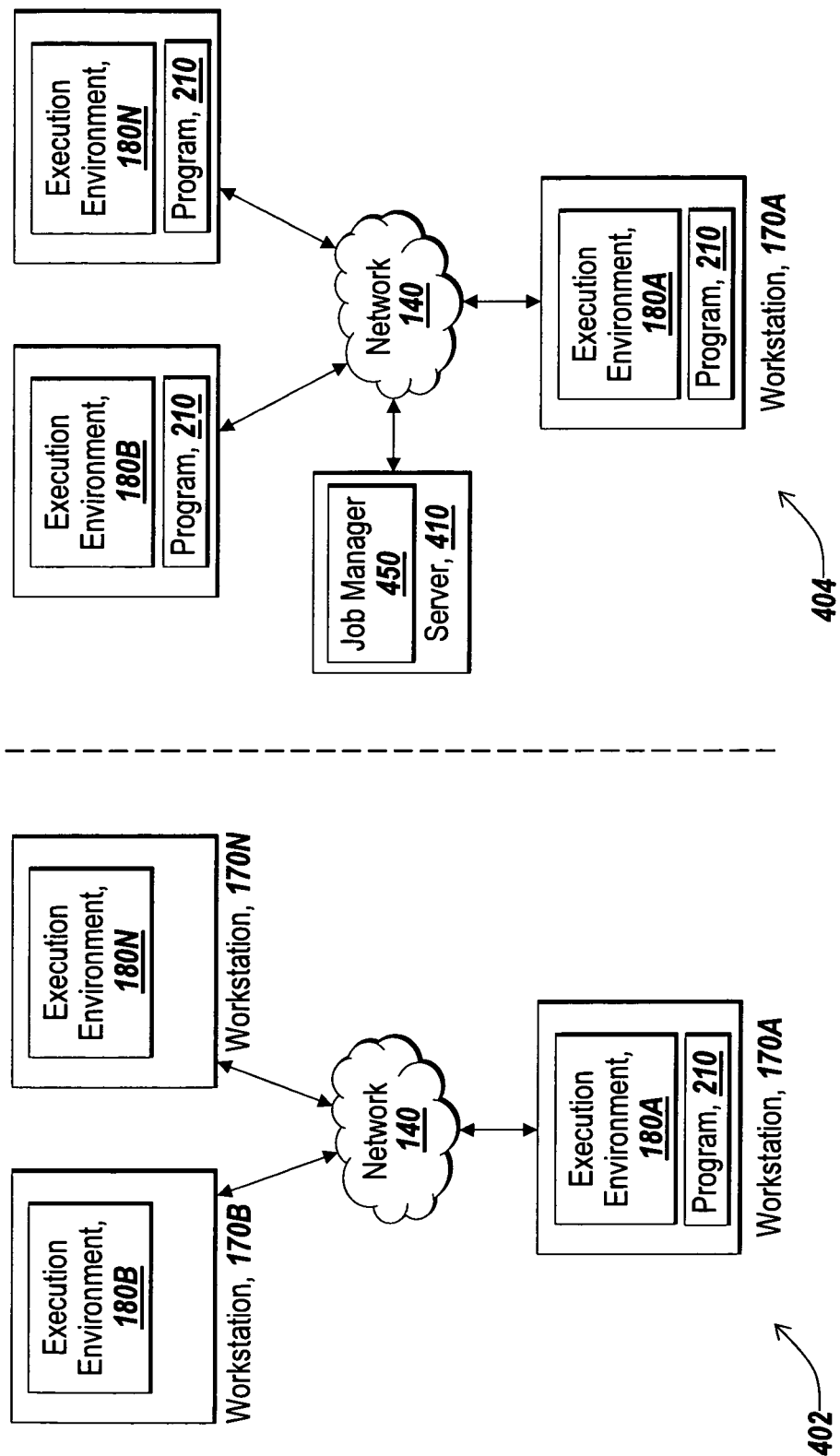
FIG. 4A is a block diagram illustrating the modes of operation in an embodiment of the present invention.

In another aspect, this present invention relates to systems and methods that provide for switching between a sequential mode of operation and a parallel mode of operation in an execution environment. FIG. 4A depicts embodiments of the present invention illustrating the modes of operation. In system 402 of FIG. 4A, the execution environments 180a-180n are each running in a sequential mode of operation. In system 404 of FIG. 4A, the execution environments 180a-180n have been initiated to operate in a parallel mode of operation.

In system 402, execution environments 180a-180n running on workstations 170a-170n are connected to a network 140. Each of the execution environments 180a-180n may be running a session or instance of a parallel technical computing environment 120 in a stand-alone mode or sequential mode of operation. That is, none of the execution environments 180a-180n have established an interface 220 to any of the other execution environments 180a-180n. At the command interface, such as the command window, of any of these execution environments 180a-180n, any program that is invoked only runs in the execution environment 180a-180n to which it was invoked. This is, for example, the typical execution scenario of a technical computing environment such as MATLAB®. Each execution environment 180a-180n may startup and terminate multiple times or open and close sessions without the other execution environments having knowledge of such activities. In this mode, in order to execute the program 210 on each of the execution environments 180a-180n would require the invocation command for the program to be entered, for example, typed in, at each of the command windows of each execution environment 180a-180n.

In system 404, execution environments 180a-180n running on workstations 170a-170n are connected to a network 140. Additionally, the system 402 comprises a server 410, e.g., computing device 102, that has a job manager 450. Each of the execution environments 180a-180n can communicate over the network 140 with each other and the job manager 450. The execution environments 180a-180n may be running a session or an instance of a parallel technical computing environment 120 that is currently configured to be running in a sequential mode of operation.

The job manager 450 is a service available on the network 104 that manages a group of tasks collectively as a single unit called a job, and on behalf of an execution environment 180a-180b, submits one or more tasks of a job to other execution environments 180a-180n registered with the job manager 450 or otherwise made known to the job manager 450. The task may comprise any operation, command or function that the execution environment 180a-180n receiving the task may perform. The job manager 450 may comprise an object-oriented interface, or any other type of interface, such as a message passing interface, to provide control of submitting jobs and/or tasks and obtaining results of the jobs and/or task. The job manager 450 can be made up of one or more applications, software components, libraries and/or interfaces. The job manager 450 may run on any of the same workstation 170a-170n as the execution environments 180a-180n or any other server 410' or workstation 170' on the network 140. Furthermore, the job manager 450 may be distributed across any workstation 170a-170n or server 410 accessible on the network 140. One ordinarily skilled in the art will recognize the various components and interfaces that may be included in the job manager 450.

There can be one or more job managers 450, 450' available on the network 140 each known by or listed with a name, such as jobmanager1 or mycluster. Each job manager 450 may have one or more execution environments 180a-180n associated with it to form a cluster of execution environments 180a-180n for a job manager 450 to send tasks to. In one embodiment, the execution environments 180a-180n register with a specific instance of a job manager 450. For example, an execution environment 180a-180n may be configured with the name of a job manager 450 to register with when the execution environment 180a-180n is started. In another embodiment, the job manager 450 may be able to determine the execution environments 180a-180n available on the network 140 by running a discovery process such as a broadcasting a message on the network 140 for available execution environments 180a-180n. In another embodiment, the execution environments 180a-180n available to receive tasks from the job manager 450 register themselves with a registration service on the network 140. For example, each time the execution environment 180a-180n starts up, it registers with the registration service, and when it shuts down it removes or otherwise inactivates its registration with the registration service. The job manager 450 can make API calls, issue commands or otherwise send requests to the registration service to determine the available execution environments 180a-180n. One ordinarily skilled in the art will appreciate the various ways an execution environment 180a-180n may be registered with or become known to a job manager 450. The execution environments 180a-180n and job manager 450 may communicate and interface with each other using any known interface techniques, such as the service oriented and extensible remote invocation approach of Jini network technology from Sun Microsystems, Inc.

Referring still to system 404 of FIG. 4A, the execution environments 180a-180n have been initiated into a parallel mode of operation as indicated by the establishment of interfaces 220 between the execution environments 180a-180n. In an exemplary embodiment, the initiation into a parallel mode of operation can be invoked by a command. For example, at one of the command interfaces of an execution environment 180a-180n, a command was invoked to change the execution environment 180a-180n to a parallel mode of operation. For example, execution environment 180a may have been running in a sequential mode of operation, or another mode besides a parallel mode of operation. The command window of execution environment 180a would show a command line prompt that the execution environment 180a was operating in a sequential mode of operation, or alternatively, a prompt associated with another mode of operation. At this command line prompt, a user may enter a command to initiate the execution environment 180a to switch to a parallel mode of operation. For example, at the command line prompt such as the standard

---

MATLAB ® prompt of ">>" a command may be invoked to turn on the parallel mode of operation such as ">>pmatlab on." Other alternative commands are:

| | |
|---|---|
| >> pmatlab on <MyCluster> | % MyCluster refers to the name of the job manager which has the nodes to perform parallel execution |
| >> pmatlab(N) | % Use N nodes in the first available cluster |
| >> pmatlab(N, <MyCluster>) | % Use N nodes in cluster named <MyCluster> |

In the above examples, the parallel technical computing environment 120 of MATLAB® may be initiated into a parallel mode of operation with additional parameters to indicate the number of execution environments 180a-180n or the cluster of execution environments 180a-180n to cooperate with for executing a computer program 210 in multiple execution environments 180a-180n. The parallel mode of operation can be turned off by issuing the command "pmatlab off" or "exit" at the "P>>" command prompt. In other embodiments, instead of executing a command, a parameter or variable may be set to a certain value to turn the parallel technical computing environment 120 of MATLAB® on or off in a particular execution environment 180a-180n. In alternative embodiments, issuing a command to switch between parallel mode of operation and sequential mode of operation, and vice-versa, may be accomplished via an application programming interface. One ordinarily skilled in the art will appreciate the various permutations of ways the execution environments 180a-180n may be switched between modes of operation.

An execution environment 180a-180n may provide an indicator of what mode the execution environment 180a-180n is currently operating. In an exemplary embodiment, the MATLAB® command line prompt will change from a ">>" to "P>>" to indicate that the execution environment 180a-180n is running in a parallel mode of operation. In another embodiment, the command window of the execution environment 180a-180n may have in a text display, such as a title bar, characters indicating the mode of operation. In yet another embodiment, a help, information or other command either issued at a command line or from a graphical menu item may indicate the current operation mode. For example, selecting the about menu selection from a help file menu may show the current version of the execution environment 180a-180n along with its current operation mode. In further embodiments, the execution environment 180a-180n may indicate the current operation mode in a combination of the above ways. One ordinarily skilled in the art will recognize the various permutations of providing an indicator of what mode of operation the execution environment is currently operating in.

In response to receiving a command to initiate the parallel mode of operation, the execution environment 180a sends a job to the job manager 450. The execution environment 180a may use the job manager specified in the "pmatlab on" command issued at the command prompt, or the name of a job manager configured in a variable or parameter setting of the execution environment 180a-180n, or a job manager 450 discovered on the network 140 by the execution environment 180a-180n. The job comprises one or more tasks. Each task comprises a request to an execution environment to initiate listening for requests from other execution environments. The job manager 450, in response to receiving the job from the execution environment 180a, processes the job and sends a task to one or more execution environments 180b-180n available to the job manager 450. The job manager 450 may send the task directly to the execution environments 180a-180n registered with the job manager 450 or known by the job manager 450 via the registration service. In another embodiment, the job manager 450 submits the one or more tasks to a repository. The repository provides a mechanism for submitting and receiving tasks. One or more execution environments 180a-180n may be registered with the repository and are notified to take the task after the task is submitted to the repository.

In one embodiment, the job manager 450 may send a task to all the execution environments 180a-180n. The definition or properties of the job may indicate the number of execution environments 180a-180n to which to submit the task. For example, in another embodiment, the job manager 450 sends a task to each of the number of execution environments 180b-180n specified in the "pmatlab on" command issued in the execution environment 180a. Furthermore, the task of the job or the job may identify the specific instances of the execution environments 180a-180b to which to submit a task. For example, each execution environment 180a-180n may be identified by a process id or pid, and a job may be submitted for a series of pids such as a range of pids 1-n, or for a specific pid number.

Additionally, each of the execution environments 180a-180n may be aware of any of the other execution environments 180a-180n available in the network 140, associated with a job manager 450, or registered with a registration service or repository. As such, each execution environment 180a-180n may know the pid of the other execution environments 180a-180n. In one embodiment, an execution environment 180a determines the other execution environments 180b-180b by querying the registration service. Alternatively, an execution environment 180a may query the job manager 450 to determine the other execution environments 180b-180n associated or known by the job manager 450. In another embodiment, an execution environment 180a can query a repository to determine the other execution environments 180a-180n. In yet another embodiment, the job manager 450 provides information about each of the execution environments 180a-180n as part of the task submitted to an execution environment 180a-180n.

In operation, the execution environment 180a-180n receives the task to establish an interface 220 for the execution environment 180a-180n. The interface is established in order to cooperate in the parallel mode of operation to receive requests from other execution environments 180a-180n. The request may include performing a task, such as for example, invoking the execution of a computer program 210. In an exemplary embodiment, the execution environment 180a-180n may establish an interface 220 via MPI function calls to establish an MPI based communication connection. In another embodiment, the execution environment 180a-180n may establish the interface 220 by listening on a port via a socket based TCP/IP connection. In another embodiment, the execution environment 180a-180n may establish a file or directory based interface 220 and wait for data to be written to a file in a directory or for a new file to be created in the directory. As discussed in conjunction with FIGS. 2B-2C, there are variety of types of interfaces the execution environments 180a-180n may establish to send and receive requests to each other. The job manager 450 may wait for a result of the task submitted to the execution environments 180a-180n to determine the success or failure of the task. In other embodiments, the job manager 450 may return a result of the job, based on the results of the tasks, to the execution environment 180a that submitted the job.

While running in parallel mode of operation, the execution environment 180a may receive a command to switch from the parallel mode of operation to a sequential mode of operation. For example, the command "pmatlab off" may be issued in the command window of execution environment 180a. In response to this command, execution environment 180a may submit a job to the job manager 450 to send a task to the execution environments 180b-180n cooperating in the parallel mode of operation to stop listening for requests and to disconnect or otherwise shutdown the established interface 220.

Figure 4B:
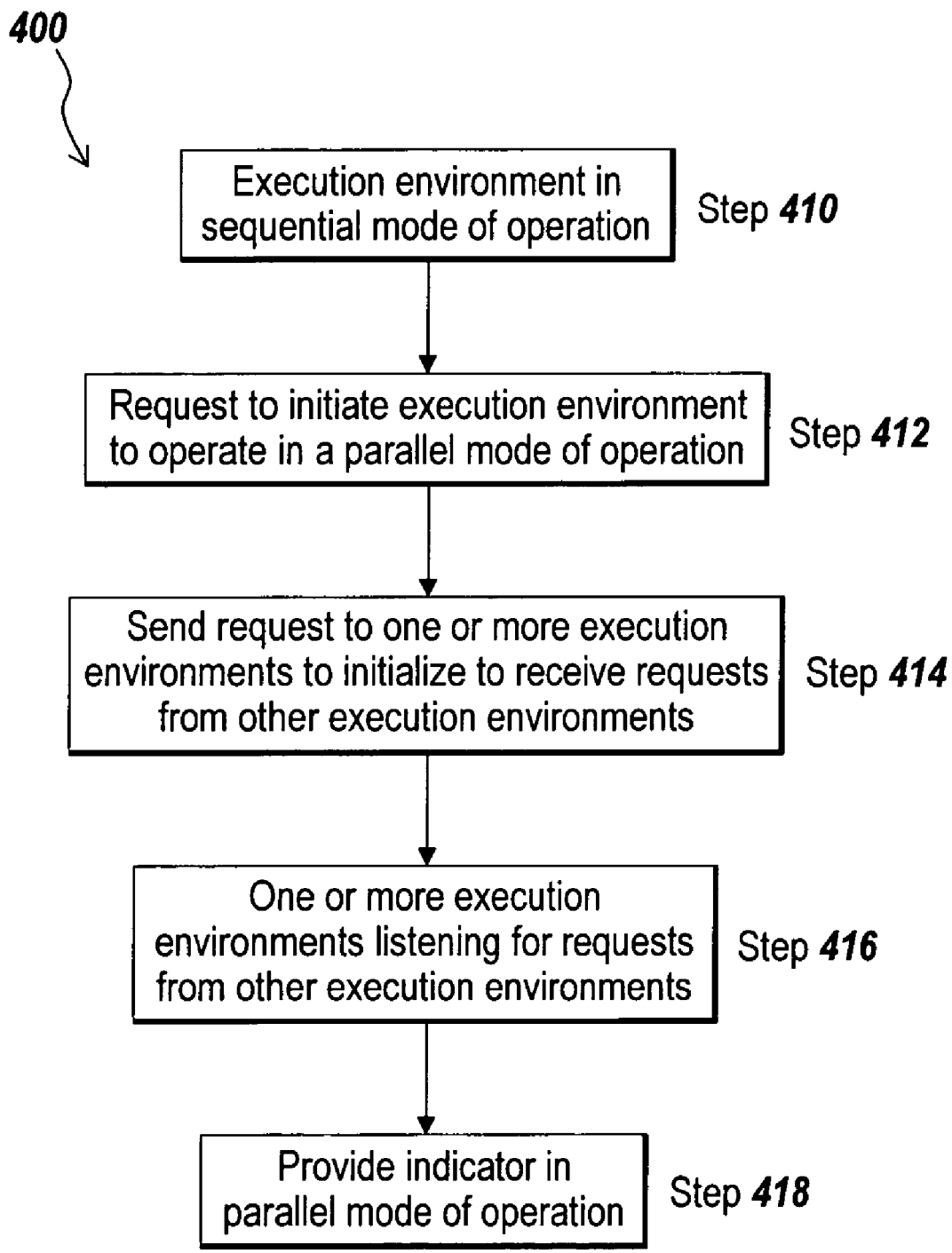
FIG. 4B is a flow diagram illustrating steps perform to initiate a parallel mode of operation in an embodiment of the present invention.

In another aspect, the present invention relates to a method for initiating an execution environment 180a-180n into a parallel mode of operation and from a parallel mode of operation to a sequential mode of operation. FIG. 4B depicts a flow diagram of method 400 for initiating an execution environment into a parallel mode of operation. Method 400 includes the steps of having an execution environment 180a-180n in a sequential mode of operation (step 410), requesting to initiate the execution environment 180a-180n to operate in a parallel mode of operation (step 412), sending a request to one or more execution environments 180a-180n to initialize to receive requests to execute a program (step 414), the one or more execution environments 180a-180n listening for requests from other execution environments (step 416) and providing an indicator that the execution environment 180a-180n is in a parallel mode of operation (step 418).

Figure 4C:
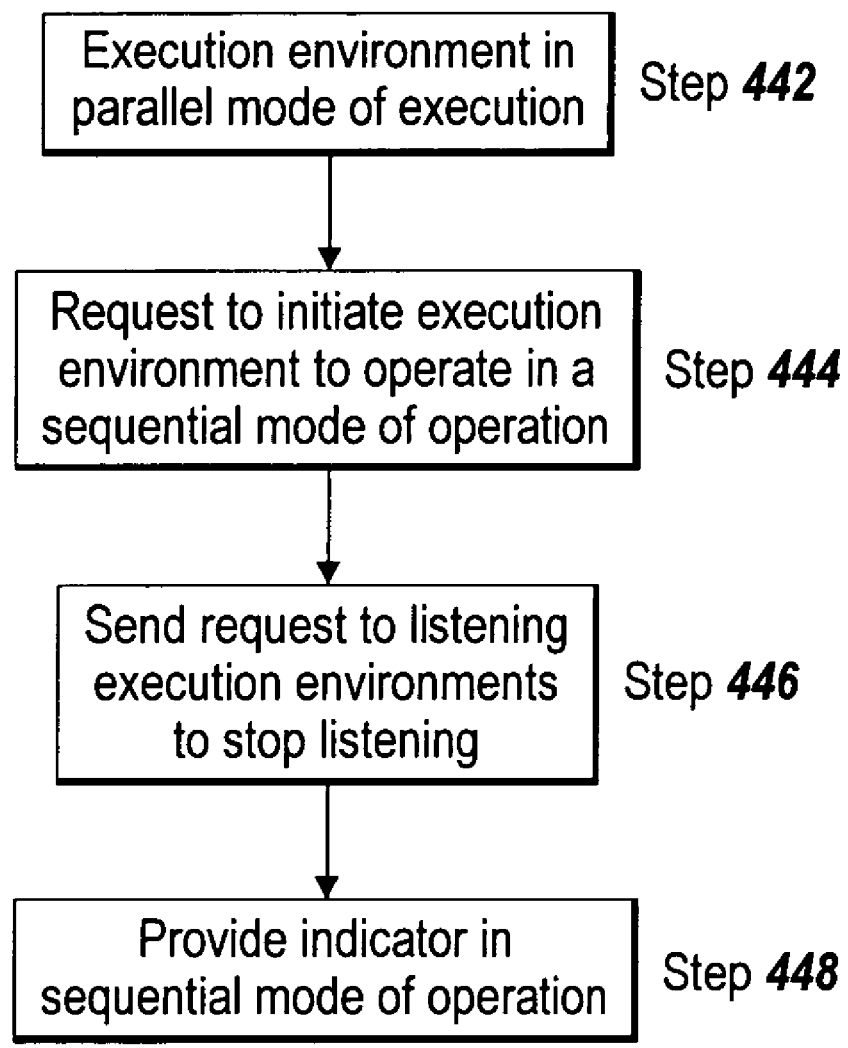
FIG. 4C is a flow diagram illustrating steps perform to initiate a sequential mode of operation in an embodiment of the present invention.

FIG. 4C depicts a flow diagram of method 440 for initiating an execution environment 180a-180n out of a parallel mode of operation into a sequential mode of operation. Method 440 includes the steps of having an execution environment 180a-180n in a parallel mode of operations (step 442), requesting to initiate the execution environment 180a-180n to operate in a sequential mode of operation (step 444), sending a request to one or more execution environments 180a-180n listening for requests to stop listening (step 446), and providing an indicator that the execution environment 180a-180n is in a sequential mode of operation (step 448).

In another aspect, the present invention relates to programming in a technical computing programming language for the parallel execution of a program in multiple execution environments 180a-180n. The present invention discussed in conjunction with FIGS. 2A-2C and FIG. 3, enables a user to run a computer program in multiple execution environments with little or no changes to the program instructions of the program. However, there may be times when a more advanced approach is required to take advantage of the parallel execution of the program in multiple environments. The present invention of a parallel technical computing environment 120 provides additional programming language statements and control constructs to provide parallel programming functionality supported by embodiments of the present invention. In brief overview, the technical programming language of the parallel technical computing environment 120 of MATLAB® provides reserved key words and built-in language statements to support distributed arrays, parallel for loops and an if conditional statement to check the current process id of the execution environment 180a-180n.

In order to provide distributed arrays and parallel for loops in a technical computing programming language, an iterator is decomposed into separate iterators for each node, or execution environment 180a-180n that will be processing the distributed array or the parallel for loop. Each execution environment 180a-180n is identified by a process id or pid between 1 and the total number of pids, or nproc. For each pid of an execution environment 180a-180n out of a total numbers of pids, a portion of the distributed array and parallel for loop may be processed separately and independently. For example, take the following iterators:
  var=start:fin or
  var=start:delta:fin; where start is the first iteration, fin is the last iteration and delta is the step increments between the first iteration and the last iteration.
In order to process a portion of the distributed array or a portion of the loop body of a parallel for loop, an iterator such as the following needs to be decomposed from the standard iterators described above:
  var=start(pid):delta:fin(pid); where start is the first iteration for the pid, fin is the last iteration for the pid, and delta is the step increments between the first iteration and last iteration for the pid.
In an exemplary embodiment, an iterator is decomposed into nproc continuous sections of equal or nearly equal iteration lengths. The following is an example algorithm described in the programming language of MATLAB® for determining equal or nearly equal iteration lengths across multiple execution environments:

```
function [startp,finp] = djays(start,delta,fin,pid,nprocs)
ratio = floor((fin−start)/delta+1)/nprocs;
startp = start+ceil((pid−1)*ratio)*delta;
finp = start+(ceil(pid*ratio)−1)*delta;
```

For example, with nproc=4 execution environments, the iterator j=1:10 is decomposed to the following:

| |
|---|
| j = 1:3 on pid = 1 |
| j = 4:5 on pid = 2 |
| j = 6:8 on pid = 3 |
| j = 9:10 on pid = 4 |

In alterative embodiments, other algorithms can be used to determine the decomposition of iterators and the length of iterators to be applied per pid for processing distributed arrays and parallel for loops across multiple execution environments 180a-180n. For example, the decomposition of the iterator may be determined by estimated processing times for each of the pids for its respective portion of the iterator. Or it may be determined by which execution environments 180a-180n are not currently executing a program or which execution environments 180a-180n are idle or have not previously executed a program 210. In another example, only two pids may be used for the iteration although several pids may be available. In yet another example, each iterator may be assigned to a specific execution environment 180a-180n, e.g. iterator 3 is always executed on execution environment 180c. In other cases, the decomposition of the iterator can be based on one or more operational characteristics of the execution environment 180a-180n, or of the computing device 102 running the execution environment 180a-180n. One ordinarily skilled in the art will appreciate the various permutations and combinations that can occur in decomposing an iterator to process portions of a distributed array and parallel for loop in multiple execution environments.

In the parallel technical computing environment 120 of MATLAB®, distributed arrays are denoted with the new keyword darray and in case of distributed random arrays, the new keyword drand. Various alternative names for these keywords, or reserved words could be applied. As keywords or reserved words of the programming language of the parallel technical computing environment 120, they have special meaning as determined by the execution environment 180a-180n and therefore are built into the language. As such, these keywords are not available as variable or function names.

Distributed arrays are distributed by applying the decomposition algorithm to the last dimension of the array. For example, a 1000-by-1000 array is distributed across 10 processors, or execution environments 180a-180n, by storing the first 100 columns on the first execution environment 180a, the second 100 columns on the second execution environment 180b and so forth. The contents of a distributed array on a particular execution environment 180a-180n is the local portion of the array. For example, if A is a distributed array, then A.loc refers to the portion of A on each execution environment 180a-180n. For example, with nproc=16, the statement
  A=drand(1024,1024) % create a distributed random array
becomes
  A=darray(1024,1024)
  A.loc=rand(1000,64)
Different random submatrices, or arrays, are generated on each one of the sixteen (16) execution environments 180a-180n. In another embodiment and for the case of a distributed array representing RGB color coding for images with dimensions of m-by-n-by-3, the decomposition and the distribution of the array occurs along the second dimension so that each execution environment 180a-180n has a full color strip form the overall image to work on in its local portion. Although the distribution of the distributed array is discussed in terms of column based distribution, various alternative methods can be used to distribute portions of the distributed array among multiple execution environments 180a-180n. For example, the distributed array can be distributed by rows or a portion of rows and columns. In another example, a portion could be distributed based on a subset of the data having all dimensions of the array. Any type of arbitrary mapping can be applied to map a portion of the distributed array to each of the execution environments 180a-180n. As such, one ordinarily skilled in the art will recognize the various permutation of distributing portions of a distributed array to each execution environment 180a-180n.

In another aspect, a distributed array may be cached. That is, an execution environment 180a-180n may store its portion of the distributed array, e.g., A.loc, but prior to performing operations on the local portion, the execution environment 180a-180n may still have read access to the other portions of the distributed array. For example, execution environment 180a may be assigned column 1 of a three column distributed array with execution environments 180b and 180c assigned columns 2 and 3 respectively. Execution environment 180a may have read access to columns 2 and 3 prior to performing operations on column 1 of the array, i.e., read and write access. However, once the execution environment 180a-180n performs an operation on its local portion of the distributed array, it may no longer have any access to the other portions of the distributed array. For example, once execution environment 180a performs an operation on column 1, it no longer will have read access to columns 2 and 3 of the distributed array.

For basic element-wise operations like array addition, each execution environment 180a-180n may perform the operation on its local portion, e.g., A.loc. No communication between the execution environments 180a-180n is necessary for the processing of the local portion of the distributed array. More complicated operations, such as matrix transpose, matrix multiplication, and various matrix decompositions, may require communications between the execution environments 180a-180n. These communications can follow a paradigm that iterates over the execution environments 180a-180n:

```
for p = 1:nprocs
  if p == pid
    processor p is in charge of this step
    send data to other processors
      do local computation
    maybe receive data from other processors
  else
    receive data from p
    do local computation
    maybe send data back to p
  end
end
```

In the above example, the number of communication messages between execution environments 180a-180n is proportional to the number of execution environments 180a-180n, and not the size of the distributed array. As such, as arrays get larger the overhead for sending messages to coordinate the array computation becomes proportionately smaller to the array data and the resulting computation time on each execution environment 180a-180n.

Figure 5A:
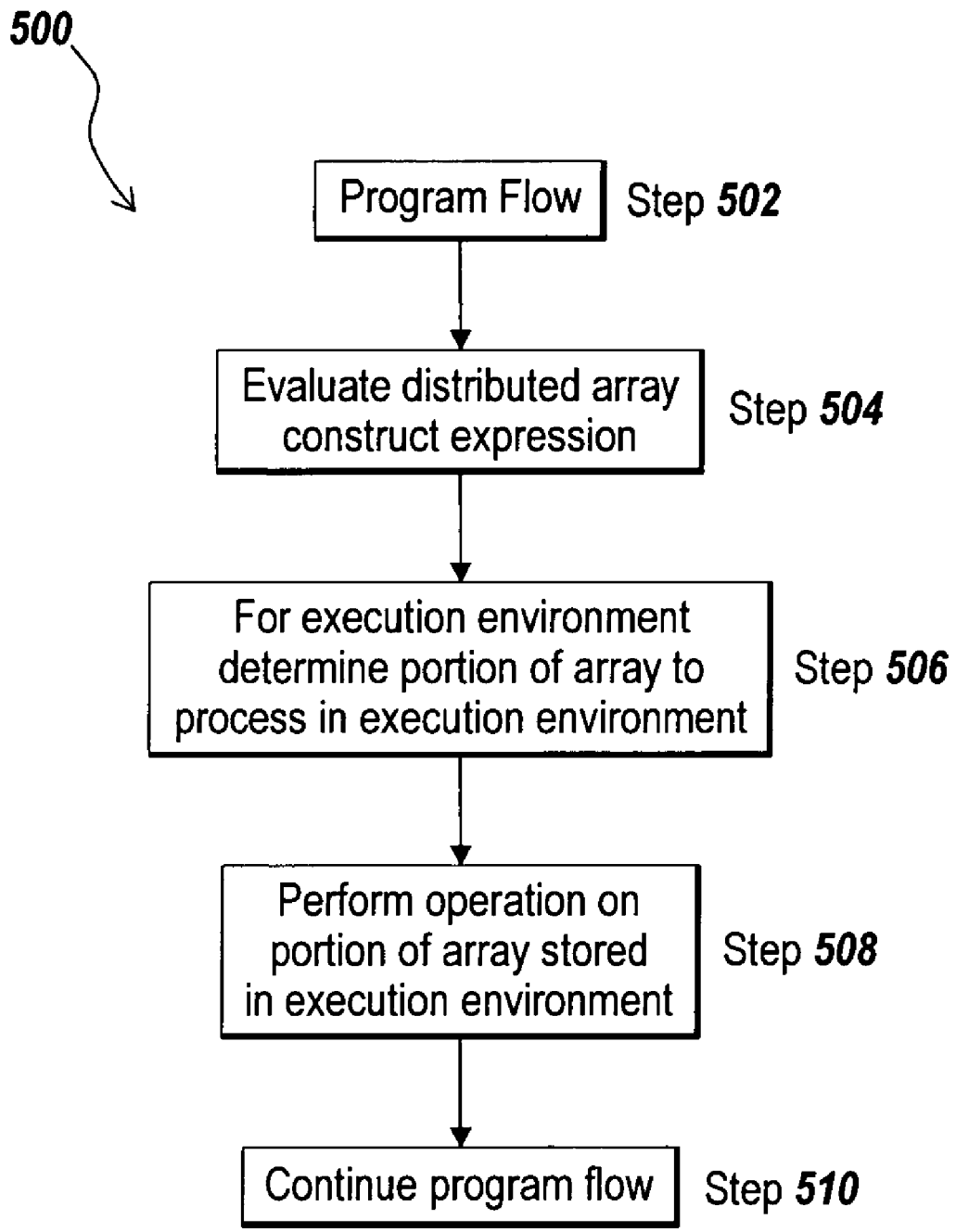
FIG. 5A is a flow diagram illustrating steps performed in a parallel loop execution of an embodiment of the present invention.

In one aspect, the present invention relates to methods for programmatically providing for distributed array processing as depicted in FIG. 5A. In the flow diagram of FIG. 5A, method 500 depicts the processing of a distributed array in execution in multiple execution environments 180a-180n. At step 502, an execution environment 180a-180n is executing a program flow of a program 210 invoked for execution. At some point during the program flow, the execution environment 180a-180n at step 504 interprets a distributed array construct in a program statement, such as a program statement comprising the keyword darray. At step 506, the execution environment 108a-108n evaluates the distributed array construct to determine the portion of the distributed array to store locally. As discussed above, the distributed array may be decomposed in a variety of ways. For example, the execution environment 180a-180n may store a specific column of the array to perform local processing. After determining and storing the portion of the distributed array, the execution environment 180a-180n may perform an operation on this portion of the array. For example, it may perform basic array operations such as addition. After handling the distributed array statement, the program flow continues to other program statements of the program 210. In another embodiment, prior to performing an operation on the local portion of the array, the execution environment 180a-180n may access or obtain data values of other portions of the array that have been cached. Although method 500 is discussed with regards to one execution environment, the same flow diagram will apply to multiple execution environments 180a-180n running the same program 210 so that at steps 504, 506 and 508 the execution environment interpreting the distributed array determines what portion of the array to store and process locally.

In the programming language of the parallel technical computing environment 120 of MATLAB®, parallel for loops are denoted by the new keywords parfor and parend. In interpreting the parallel for loop keyword of parfor, a preprocessing step is performed that translates:

```
parfor x = start:delta:fin
parend
into
  x = parforstart(start,delta,fin):delta:parforfin(start,1,fin)
  end
``` on each execution environment 180a-180n. The preprocessing functions for decomposing the parallel for loop iterators are described in the programming language of MATLAB®:

```
function pfstart = parforstart(start,delta,fin)
set(0,'parforstate',1)
ratio = floor((fin−start)/delta*(1+4*eps)+1)/nprocs;
pfstart = start+ceil((pid−1)*ratio)*delta;
function pffin = parforfin(start,delta,fin)
ratio = floor((fin−start)/delta*(1+4*eps)+1)/nprocs;
pffin = start+(ceil(pid*ratio)−1)*delta;
function parforend
set(0,'parforstate',0)
```

The parforstate function provides a flag to indicate that processing of statements within the loop body are occurring within a parallel for loop. This is to handle cases where scoping rules may change because of the parallel programming paradigm, such as in the following example where a distributed array is processed within the body of a parallel for loop:

```
A = darray(m,n)
parfor j=1:n
    A(:,f(j)))
parend
```

In this case, reference to a portion of a distributed array requires participation by the execution environment 180a-180n that owns the portion of the distributed array and the execution environment 180a-180n that wants to use a portion of the distributed array. Setting the parforstate flag will allow for detecting this occurrence and avoiding any race conditions.

The use of a parallel for loop stipulates that each iteration of the loop body can be evaluated independently of the other iterations. By way of example, the following are two variations of an example use of the parallel for loop:

```
S = darray(1,n);        % Example 1
parfor k = 1:n
    S(k) = F(k)
parend
total = sum(S)
s = 0;                  % Example 2
parfor k = 1:n
    s = s + F(k)
parend
total = gop(@plus,s)
```

In both examples, each of the terms F(k) is computed independently on each execution environment 180a-180n. No communication between execution environments 180a-180n is required until the final statement of the example. In the first example, the individual terms become elements of a distributed array. The final total is computed by the sum method for distributed arrays. In the second example, each execution environment 180a-180n computes a partial sum in the conventional manner. Before the final statement, the variable s may have a different value on each execution environment 180a-180n. In order to compute the final total in this example, a powerful function "gop", which stands for "global operation", is called. The following are example program instructions for this global operation function:

```
function y = gop(F,x)
% GOP Global operation
% gop(@F,x) is the "accumulation" via the function F
% of the quantities x from each processor.
% gop(@plus,x) is the sum of the x's from each processor.
% gop(@max,x) is the max of the x's from each processor.
% gop(@horzcat,x) is the horizontal concatenation of the x's.
% gop(@(x,y)norm([x y]),x) is the 2-norm of all the x's.
% Note: @ sign denotes anonymous function
for p = 1:nprocs
    if p == pid
        dsend('all',x);
        z = x;
    else
        z = drecv(p);
    end
    if p == 1
        y = z;
    else
        y = F(y,z);
    end
end
```

As described by these example program instructions, the global operation function provides for the accumulation of results from each of the execution environments 180a-180n. Additionally, the technical computing programming language of the parallel technical computing environment 120 may comprise the functions of nproc and pid. The function nproc returns a value of the total number of pids or execution environments 180a-180n, and the function pid returns a value of the pid of the current execution environment 180a-180n. Each function may have a default value of 1.

Figure 5B:
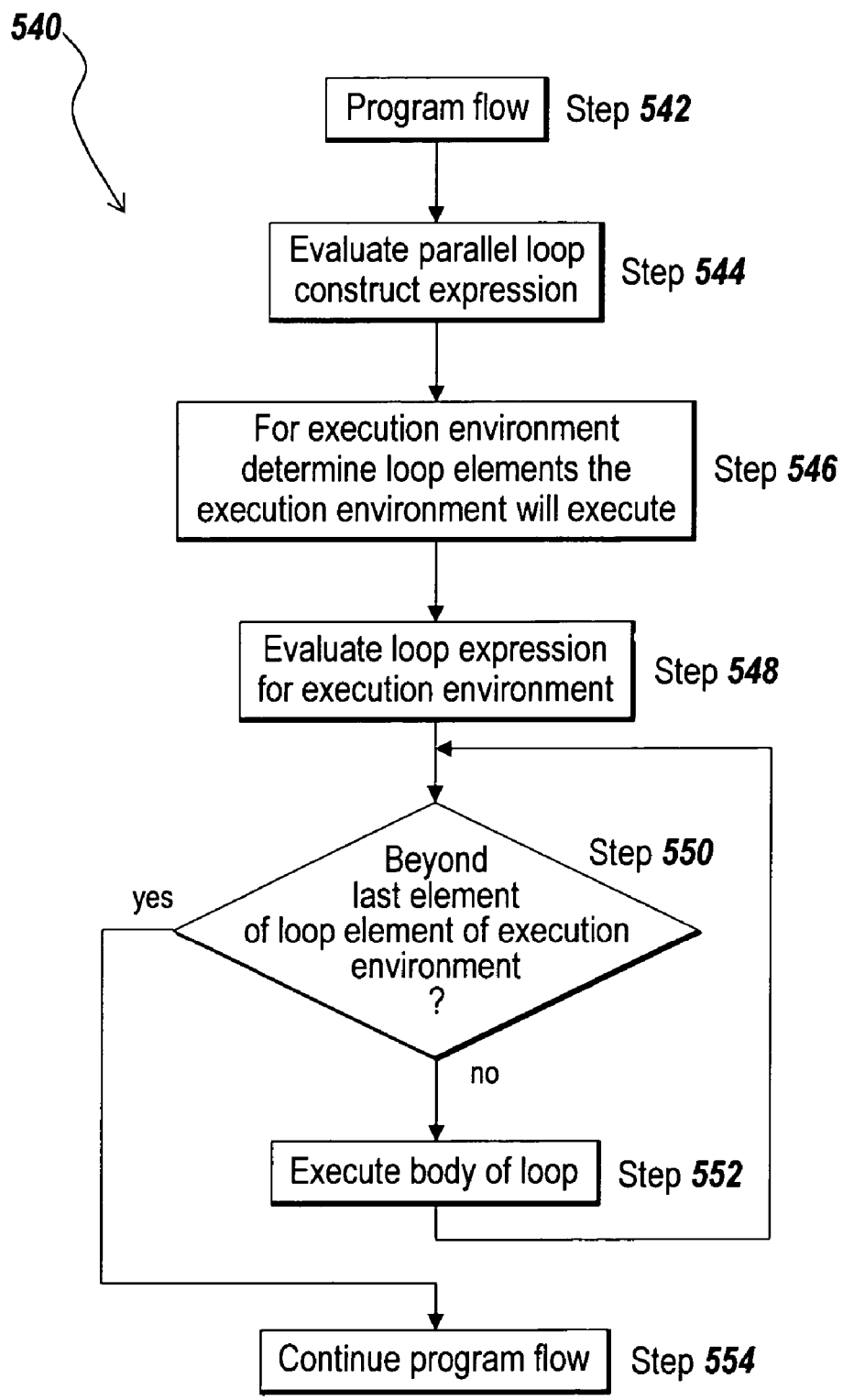
FIG. 5B is a flow diagram illustrating steps performed in executing a distributed array in an embodiment of the present invention.

In one aspect, the present invention relates to methods for programmatically providing for parallel for loop processing. Referring now to FIG. 5B, the method 540 depicts a flow diagram for interpreting and executing a parallel for loop in a program 210 being executed by an execution environment 180a-180n. At step 542, an execution environment 180a-180n is executing a program 210 and at step 544 interprets a program statement comprising a parallel for loop construct, such as one using the keyword parfor. The execution environment 180a-180n in evaluating the parallel for loop expression determines what iterations of the loop that the current execution environment 180a-180n will execute. At step 548, the execution environment 180a-180n then processes and evaluates the determined loop expression. For example, if the parfor expression at step 546 defines loop iterations 1 to 10 in 1 step increments in a two pid environment, e.g., pids 1 and 2, the execution environment 180a-180n of pid 1 may determine the local loop expression for processing at step 548 are loop elements 1 to 5. Then at step 550, the execution environment 180a-180n determines if the local loop iteration is the last iteration. If not, the execution environment 180a-180n executes the loop body at step 552 and flows back to the step 550 to determine if it is the last loop iteration for local processing of the parfor. If it is yes, then the execution environment 180a-180n continues with the next set of program statements of the program 210. Method 540 applies to any of the multiple execution environments 180a-180n that may be running the same program 210 and executing the same parfor program statement. Each execution environment 180a-180n will perform steps 544 through 552 to process the iterations of the parfor loop expression determined to be for that execution environment 180a-180n.

The parallel technical computing environment 120 of MATLAB® also provides for a new keyword of ifpid that is programming language keyword used to conduct a conditional test and execute a block, or body, of statements if the test evaluates to true. The ifpid statement allows the program to execute some statement if the pid of the execution environment is equal to the value of the expression, or the conditional test. The ifpid keyword will determine the pid of the execution environment executing the ifpid program instruction and evaluate the value against the expression to determine if the conditional is true or false. For example, the following statements may be executed on multiple execution environments 180a-180n, such as pid 1 and pid 2:

```
ifpid <expression>
    % Block A statements
else
    % Block B statements
end
```

When the execution environment 180a-180n of pid 1 is executing these program statements and the expression evaluates to a value of 1, the conditional is true and the execution environment 180a-180n executes the program statements of Block A. Otherwise, if the expression is not equal to a value of 1, the conditional is false and the execution environment 180a-180n executes the program statements of Block B. In a similar fashion, when execution environment 180a-180n with pid 2 is executing these program statements, if the expression evaluates to a value of 2, Block A statements are executed. Otherwise, if the expression evaluates to a value not equal to 2, the execution environment 180a-180n executes Block B statements. Although this embodiment of ifpid is shown with an if else type of conditional construct, it can also be used in a simple in an ifpid case without the else or in nested ifpid else statements. In alternative embodiments, the execution environments 180a-180n may not have a pid associated with it but may have a name associated with it. In another embodiment, the execution environments 180a-180n may have a name associated with it in addition to the pid. In the cases of a name association with the execution environments 180a-180n, the ifpid can execute a string comparison between the name of the execution environment 180a-180n and the string of the expression.

Figure 5C:
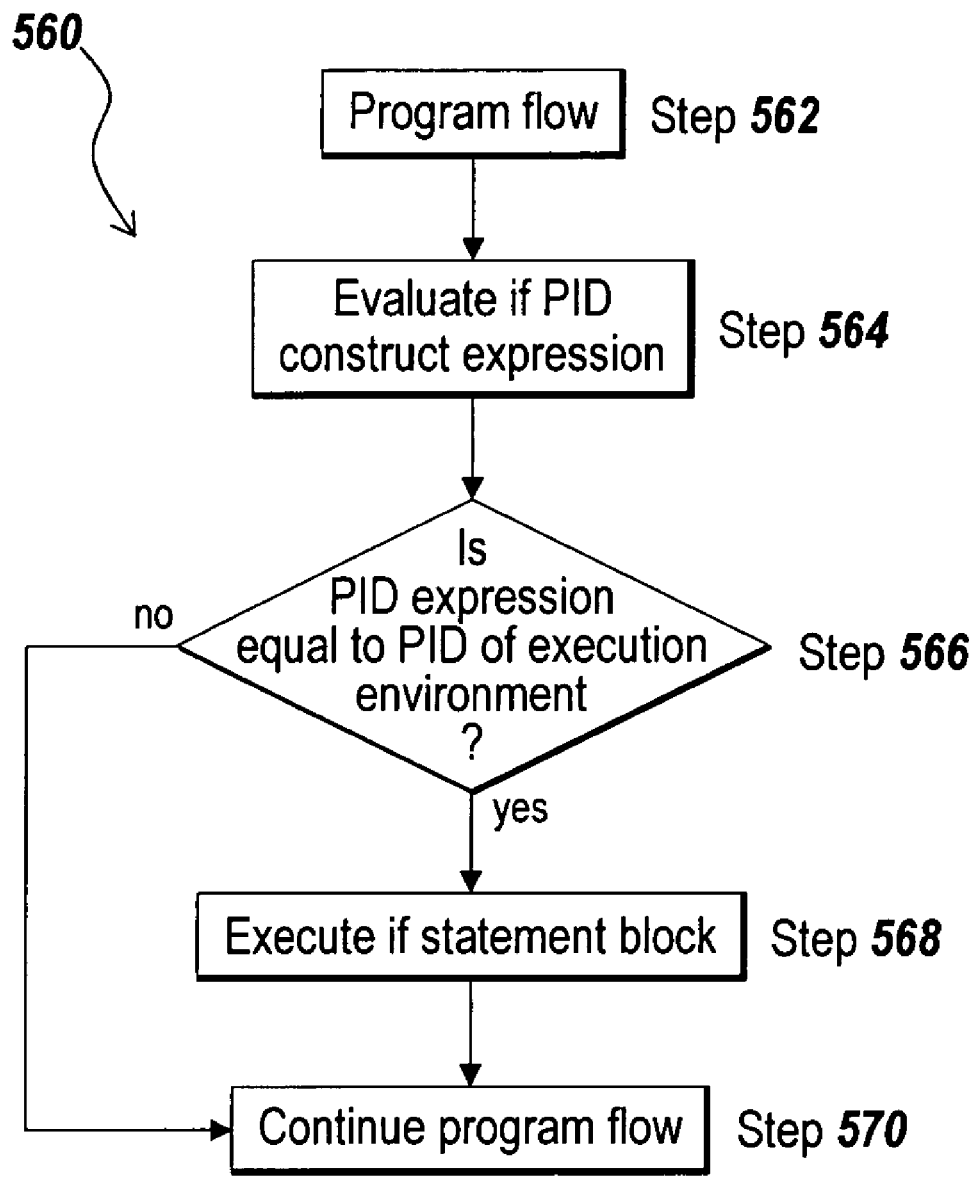
FIG. 5C is a flow diagram illustrating steps performed in execution of a conditional process identification statement in an embodiment of the present invention.

In another aspect, the present invention relates to methods for programmatically providing for the ifpid statement processing. Referring now to FIG. 5C, the method 560 depicts a flow diagram for interpreting and executing an ifpid statement in a program 210 being executed by an execution environment 180a-180n. At step 562, an execution environment 180a-180n is executing a program 210 and at step 564 interprets a program statement comprising an ifpid construct. The execution environment 180a-180n determines its pid to evaluate the conditional expression of the ifpid statement. At step 566 if the expression of the ifpid evaluates to the value of the pid of the execution environment 180a-180n, the execution environment 180a-180n will execute the if statement block at step 568 and then continue with program flow at step 570. Otherwise if the pid is not equal to the value of the expression at step 566, the execution environment 180a-180n skips executing the if block statements at step 568 and continues with program flow at step 570. In parallel operation mode of execution, multiple execution environments 180a-180n may be executing the same program 210 and evaluating the same ifpid construct in accordance with method 560.

The programming language of the parallel technical computing environment 120 of MATLAB® also supports message passing to send and receive messages between execution environments 180a-180n. Message passing provides for coordination of data and activities between execution environments when executing a program 210 in parallel. The following is a set of example embodiments of send and receive functions for message passing, for example via a message passing interface 220:

```
function dsend(varargin)
% DSEND Send message
% dsend(to,msg1,msg2,...)
% dsend('all',msg1,msg2,...)
function [varargout] = drecv(from)
% DRECV Receive message
% [msg1,msg2,...] = drecv(from)
% [msg1,msg2,...,from] = drecv(que)
```

The message parameter of these functions may comprise one or more MATLAB® data elements. For example, a message may comprise the elements of a MATLAB object, an array, a string or function handles and arguments. The message may comprise one or more of these elements in various combinations. The number of output message parameters returned by a drecv function may be equal to the number of message inputs parameters provided for the originating dsend. A send function can be to one particular node, or execution environment 180a-180n, or the send can broadcast a message to all available nodes or execution environments 180a-180n. In one embodiment, the send function can block and in other embodiments, it may not block. In a similar manner, the receive function may receive one or messages from a particular execution environment 180a-180n or from a list of specific execution environments 180a-180n Many alterations and modifications may be made by those having ordinary skill in the art without departing from the spirit and scope of the invention. Therefore, it must be expressly understood that the illustrated embodiments have been shown only for the purposes of example and should not be taken as limiting the invention, which is defined by the following claims. These claims are to be read as including what they set forth literally and also those equivalent elements which are insubstantially different, even though not identical in other respects to what is shown and described in the above illustrations.

What is claimed is:

1. A method for programmatically providing a technical programming language control structure for parallel technical computing with a plurality of technical computing environments, the method comprising:
providing, using a computing device, the technical programming language control structure representing a parallel loop with a loop body comprising one or more program instructions to be executed in the plurality of technical computing environments,
a first technical computing environment of the plurality of technical computing environments running a first technical computing program,
a second technical computing environment of the plurality of technical computing environments running a second technical computing program, where the first technical computing program and the second technical computing program:
are generated using technical computing software,
have a same functionality,
include the technical programming language control structure and at least one program instruction separate from the technical programming language control structure;
receiving an instruction by the computing device while the plurality of technical computing environments are running, the instruction for selecting an algorithm from a plurality of algorithms based on one or more operational characteristics of the plurality of technical computing environments, the plurality of algorithms determining how to decompose an iterator of the loop into a plurality of sections;
decomposing, using the computing device, the iterator of the loop into the plurality of sections according to the selected algorithm; and
invoking, using the computing device, execution of the program instruction to perform a first iteration of the loop body by the first technical computing environment and to perform a second iteration of the loop body by the second technical computing environment.

2. The method of claim 1, wherein the technical programming language control structure comprises a built-in keyword of a technical programming language.

3. The method of claim 1, wherein the first iteration of the loop body is executed independently from the second iteration of the loop body.

4. The method of claim 1, wherein the loop body comprises one or more program instructions to be performed only by one of the first technical computing environment and the second technical computing environment.

5. The method of claim 1, wherein the algorithm indicates decomposing the iterator of the loop based on estimated processing times of each of the plurality of sections.

6. The method of claim 1, wherein the algorithm indicates decomposing the iterator of the loop based on determining processing loads of each of the plurality of technical computing environments.

7. The method of claim 1, wherein the algorithm indicates decomposing the iterator of the loop so as to assign a given section to a given technical computing environment, independent of processing load of the technical computing environment.

8. The method of claim 1, wherein the algorithm indicates decomposing the iterator of the loop based on one or more operational characteristics of a given technical computing environment.

9. A non-transitory device readable medium holding device readable instructions for programmatically providing a technical programming language control structure for parallel technical computing with a plurality of technical computing environments comprising:
   providing, using a computing device, the technical programming language control structure representing a parallel loop with a loop body comprising one or more program instructions to be executed in the plurality of technical computing environments,
      a first technical computing environment of the plurality of technical computing environments running a first technical computing program,
      a second technical computing environment of the plurality of technical computing environments running a second technical computing program, where the first technical computing program and the second technical computing program:
         are generated using technical computing software,
         have a same functionality,
         include the technical programming language control structure and at least one program instruction separate from the technical programming language control structure;
   receiving an instruction by the computing device while the plurality of technical computing environments are running, the instruction for selecting an algorithm from a plurality of algorithms based on one or more operational characteristics of the plurality of technical computing environments, the plurality of algorithms defining how to decompose an iterator of the loop into a plurality of sections;
   decomposing, using the computing device, the iterator of the loop into the plurality of sections according to the selected algorithm; and
   invoking, using the computing device, execution of the program instruction to perform a first iteration of the loop body by the first technical computing environment and to perform a second iteration of the loop body by the second technical computing environment.

10. The medium of claim 9, wherein the technical programming language control structure comprises a built-in keyword of a technical programming language.

11. The medium of claim 9, wherein the first iteration of the loop body is executed independently from the second iteration of the loop body.

12. The medium of claim 9, wherein the loop body comprises one or more program instructions to be performed only by one of the first technical computing environment and the second technical computing environment.

* * * * *